3 Sheets—Sheet 2.

A. D. MILLER.
BALING PRESS.

No. 184,539. Patented Nov. 21, 1876.

Witnesses
Geo. H. Strong
Jno. L. Boone

Inventor
Allen D. Miller
by Dewey & Co.
Attys

3 Sheets—Sheet 3.

A. D. MILLER.
BALING PRESS.

No. 184,539. Patented Nov. 21, 1876.

Jno. L. Boone
Charles G. Page

Allen D. Miller
by Dewey & Co.
Attys.

UNITED STATES PATENT OFFICE.

ALLEN D. MILLER, OF SACRAMENTO, CALIFORNIA.

IMPROVEMENT IN BALING-PRESSES.

Specification forming part of Letters Patent No. 184,539, dated November 21, 1876; application filed July 6, 1876.

*To all whom it may concern:*

Be it known that I, ALLEN D. MILLER, of Sacramento city and county, State of California, have invented a Baling-Press; and I do hereby declare the following description and accompanying drawings are sufficient to enable any person skilled in the art or science to which it most nearly appertains to make and use my said invention without further invention or experiment.

My invention relates to certain improvements in baling-presses for hay and other materials; and it comprises the compression of the bale rapidly and powerfully by means of a double fusee, in combination with pulleys and a rope-wheel; a novel means for locking and unlocking the doors of the press; a method of making the bale perfectly true and rectangular, and for releasing it easily from the press after it is secured. It also comprises means for compressing the bale at the points where the ropes, wire, or other confining device encircles the bale, so that when it is removed from the press it will not spring and become too large, and other devices, which will be more fully described by referring to the accompanying drawings, in which—

Figure 1:
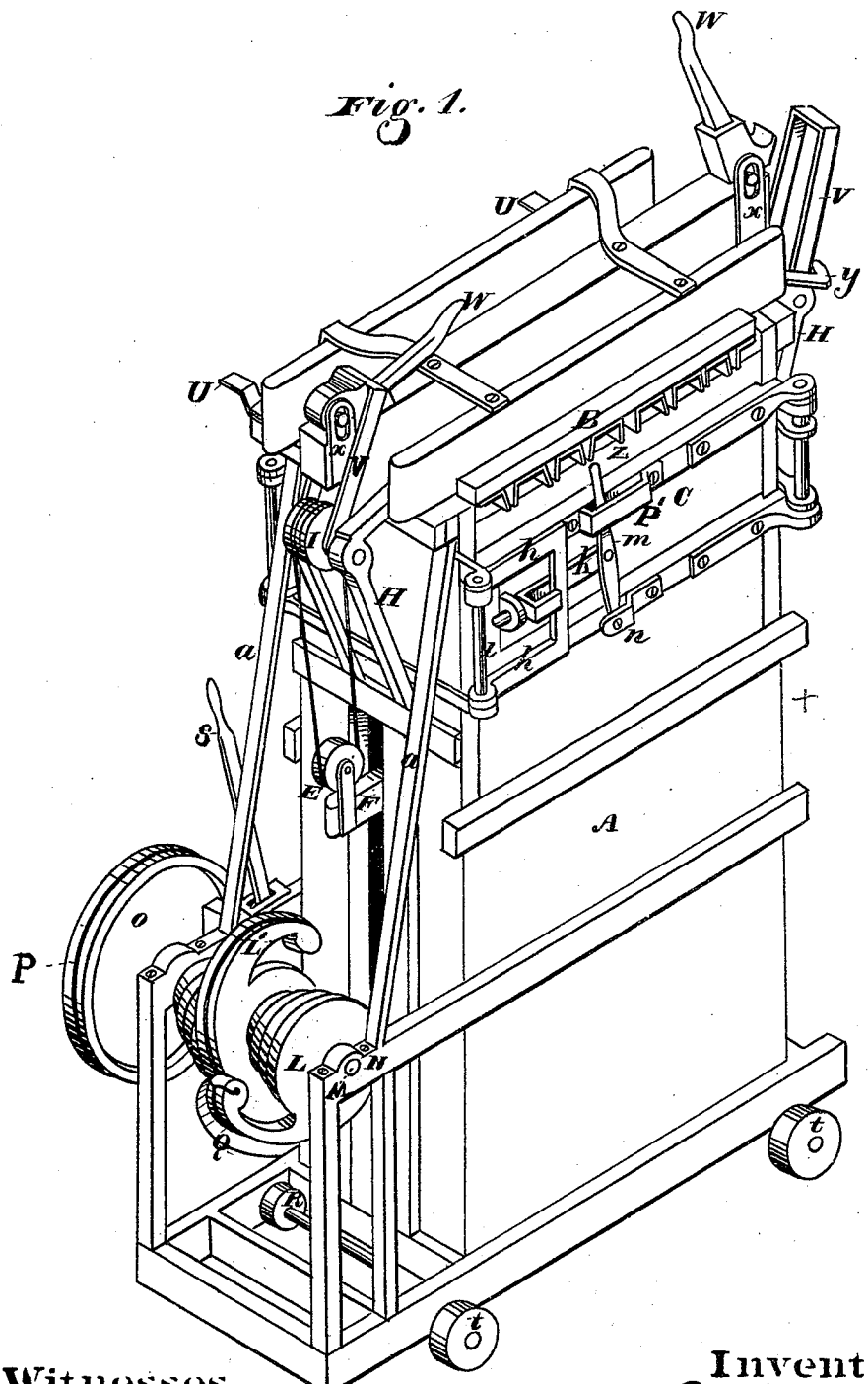
Figure 2:
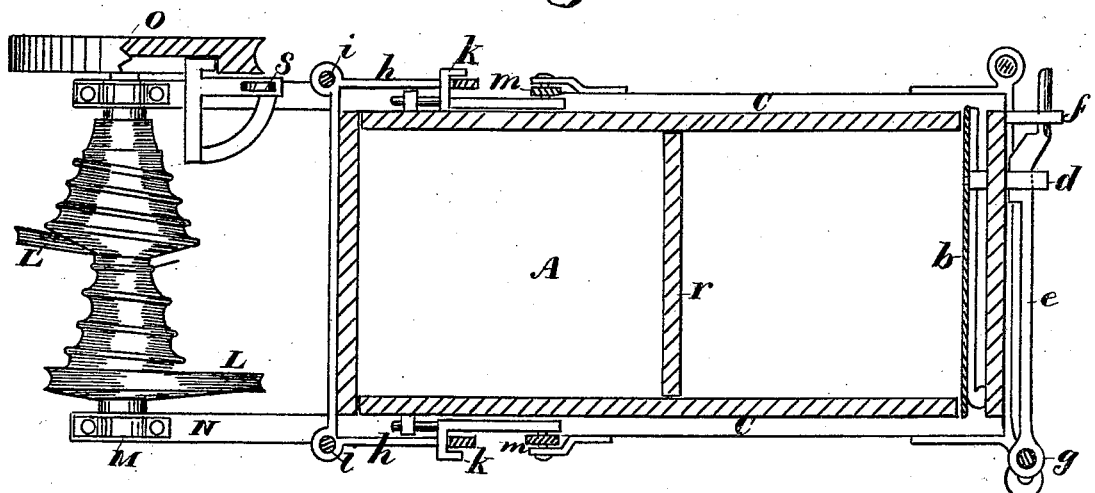
Figure 3:
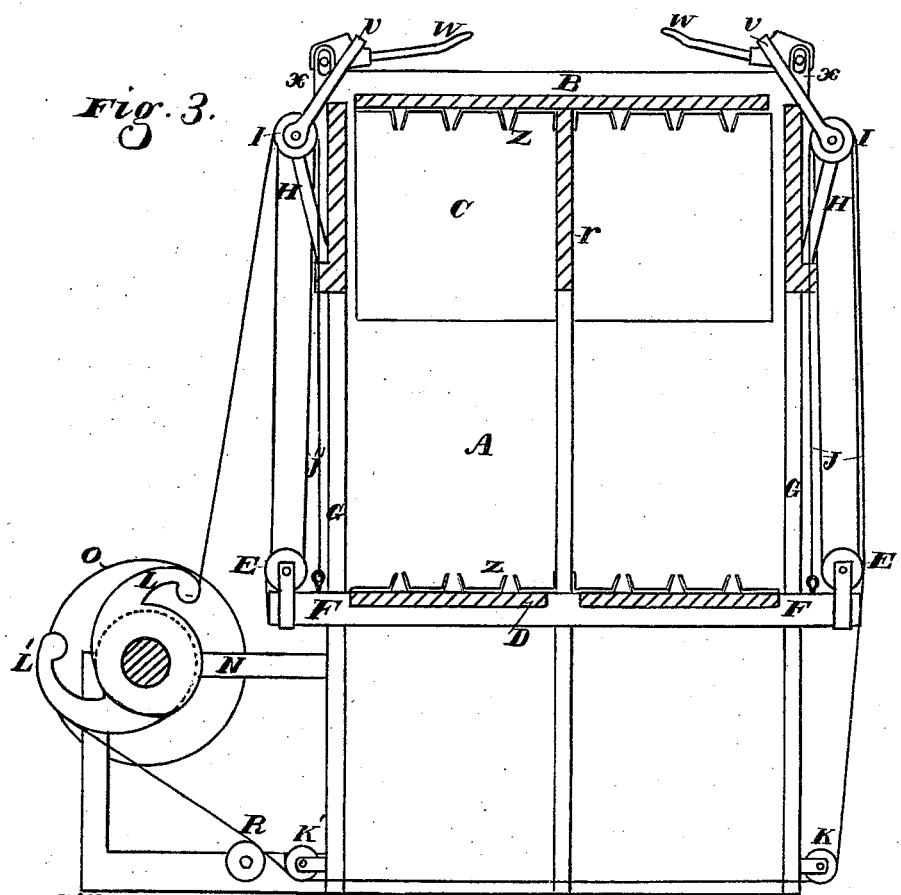
Figure 4:
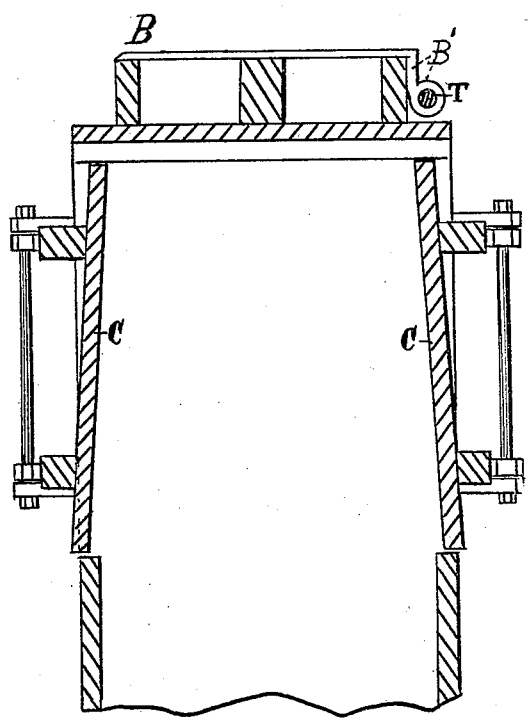
Figure 5:
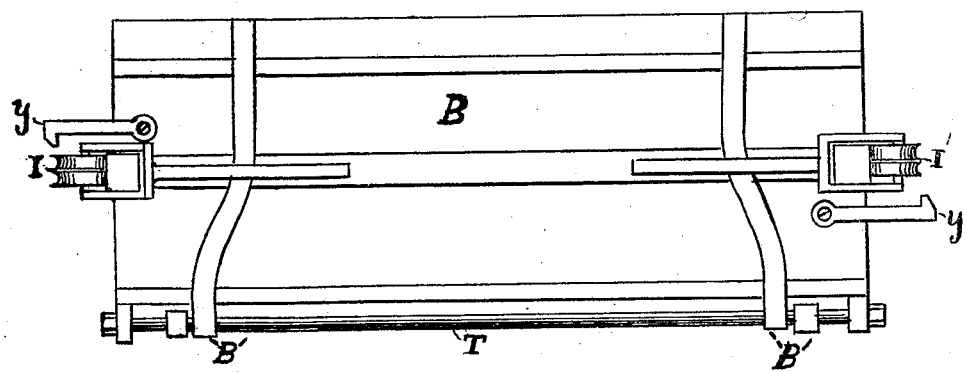

Figure 1, Sheet 1, is a perspective view of my machine. Fig. 2, Sheet 2, is a horizontal section. Fig. 3, Sheet 2, is a vertical section. Fig. 4, Sheet 3, is a vertical section. Fig. 5, Sheet 3, is a top view of the cover.

A is the body of my press, which is a vertical one, provided with the door B at the top, through which the material to be baled is introduced, and having side doors C, through which the bale is discharged after it is finished. The follower D moves from the bottom of the press upward, and is operated by ropes or chains passing over pulleys E, secured to the ends of a stout timber, F, which projects from the follower through vertical slots G in the ends of the press. At the top of the press, on each end, I fix a stout frame of iron, H, and in this frame I mount the pulleys I I.

The operating rope or chain J at one end of the press has one end secured to the timber F of the follower, passing thence around the pulleys I, E, and I, and thence to the pulley K, which is secured at the bottom of the press, and acts as a leader for the rope, so that it passes beneath the press, under the guide-pulley K, and thence to the end of the cam or long arm of the fusee L.

The rope J' at the end of the press next to the fusee, after passing around pulleys I and E in a similar manner, passes directly from the pulley I to the end of the arm L. The fusees are two in number, and are mounted upon a shaft, M, which extends across the frame N, and is placed directly in front of one end of the press. O is a drum, upon which the rope P is coiled, and when this rope is uncoiled by drawing it out, the fusees are rotated, and the follower is drawn up, the motion being rapid at first, but gradually becoming slower and more powerful as the bale approaches completion.

The arms L L' are cast separate from the smaller part of the fusee, and are bolted on, and they are provided with flanges Q, to prevent the rope from running off when it starts to wind up.

In order to guide the rope which passes beneath the press, and prevent it from leaving its pulley, I mount a grooved roller, R, upon a shaft between the pulley K' and the arm L', and this assists to retain and lead the rope.

Upon the frame N is mounted a brake-lever, S, and this operates a shoe, which is made to press upon the inside of the flange of the drum O, so as to regulate the speed of the rope as it unwinds, or to hold it at any point.

The top door B has strong strap-hinges B', Figs. 4 and 5, turning upon the axis or shaft T; and in order to support the door when open, I have secured arms U, Fig. 1, to the side of the press, so that when the door is opened it will rest upon these stops, and stand at right angles with its position when closed.

This door is secured, when closed, by means of a strong link, V, at each end, which is pivoted to the axis of the pulleys I in the frame H, and the bight of this link is hooked upon a lever, W, as shown. This lever has its fulcrum in the slotted arms X, which project upward from the end of the central timber of the door; and when the lever is thrown down upon the door, with the link hooked upon it, the link will be inside of the line of the fulcrum, so that the strain of pressing the bale will have no tendency to force the door open.

By means of the slotted arms X the fulcrum of the lever is allowed a certain amount of vertical motion, so that the door B will accommodate itself if there should be hay upon the edges of the press, which would prevent its closing tight.

Hooks y, Fig. 5, are secured to the frame H, and these hooks serve as stops to prevent the links V and levers from falling too far out of reach when they are thrown back for the purpose of opening the door.

The face of the door B and the face of the follower have angle-plates Z secured to them transversely, and these plates are separated sufficiently to admit the baling-cords between them. The edges of these plates press into the hay, so that, when the cords are made fast in these grooves, the greater compression at these points will prevent the bale from expanding when released from the press.

The great strain to which the press is subjected usually forces it to spread at the top, also spreads the exit-doors C, so that, when the bale is finished, it is considerably wider at the top than at the bottom. In order to counteract this tendency, and allow the bale to be turned out in a rectangular shape, I fit the doors C upon their hinges so that they will stand at a slight angle with the sides of the press, and approach each other at the top, as shown in Fig. 4, Sheet 3. The ends of the press are also strongly supported by braces a from the supplemental frame N; and in order to free the bale from end pressure, and allow it to be easily removed from the press after it is finished, I make a false inside end plate, b, Fig. 2, which is hinged at one side to the end of the press, and has two arms, d d, passing from its opposite side through the end of the press, these arms being slotted upon the outside to receive the arms e. These arms are bent to form inclined planes where they pass through the slots, and have one end moving through guides f, while the opposite ends are connected with a crank or eccentric, g, upon the hinge-bolt or shaft of the side door C.

The operation of this device will then be as follows: When the door C is closed, the inclined sliding arms e will force the arms d and the plate b inward, where they will remain until the bale is finished. When the door is opened, the action of the inclined sliding arms will draw the plate back, so as to leave the bale free to be removed.

The method of locking the doors C, so that they will be held strongly and opened easily, is as follows: A stout bail, h, is secured to the end frame of the press, so as to swing about the vertical axis i and lie against the front of the door, extending to a considerable distance across it.

This bail is secured in place by means of a hook-bolt, k, having a guide at one end sliding in a socket, I, while the other end is secured to a lever, m, which has its fulcrum strongly secured at n, while its upper end works beneath a strong strap-guide, P'. By this construction the pressure from the interior of the machine against the door will be distributed along the bail from its inner to its outer end, and also along the bolt k, which is supported at both ends, as shown, thus lessening the strain upon any single part. By simply moving the lever m forward, the bail is released from the hook, so that it can be swung back and the door allowed to open.

My press is made with a vertical diaphragm, r, Figs. 2 and 3, through its center, and the timber F of the follower passes through a slot in the diaphragm similar to those at G, so that my press is really a double one, pressing two bales at once, which I am enabled to do by reason of the combination of mechanical powers, which I use to operate the follower, and the construction of the two fusees close together upon a short shaft, so that there will be no danger of breaking it.

The press is provided with small wheels t, upon which to move it short distances in the field; but when it is to be transferred to any considerable distance, it is supported from the center of a wagon, resting upon the beams of the supplemental frame N.

Having thus described my invention, what I claim as new, and desire to secure by Letters Patent, is—

1. The double fusee L L', having the long arms cast separate from the smaller part, and provided with the guiding-flanges Q, said fusee being mounted upon the short shaft M at one end of the press, and operated by the drum O and rope P, substantially as herein described.

2. In combination with the double fusee L L' and the operating-drum O, mounted at one end of the press, so as to act in the direction of its length, the pulleys E I I, with the rope or chain J and J', and the leading-pulleys K K', for the purpose of operating both ends of the follower from the double fusee, substantially as herein described.

3. The guiding-roller R, in combination with the leading-pulleys K K', rope J, and fusee L, substantially as and for the purpose herein described.

4. In combination with the drum O, fusee L L', pulleys E I, rope J J', pulleys K K', and follower D, the brake S, operating to regulate the movement of the drum, substantially as herein described.

5. In combination with the door B, hinged to the horizontal shaft or axis T, the stops or supports U, for the purpose of retaining the door in position when open, substantially as described.

6. The bail V, pivoted to an axis in the frame H, and fitted to be hooked upon the lever W, said lever having its fulcrum movable in the slotted supports $x$, to accommodate the closing of the door, and to lock it when closed, substantially as herein described.

7. In combination with the link V and lever W, the hook or stop $y$, to prevent them from being thrown too far back, substantially as herein described.

8. The movable internal end plate $b$, fitted to be moved outward and release the bale when the door C is opened, substantially as herein described.

9. In combination with the movable plate $b$, the slotted arms $d$ and sliding arms $e$, with their inclined faces, said arms being operated by the opening of the door by means of cranks or eccentrics $g$, substantially as herein described.

10. The bail $h$, turning on the vertical axis $i$, so as to lie against the front of the door, in combination with the hook-bolt $k$ and its socket I, and the lever $m$, having its fulcrum and moving in the guide, substantially as herein described.

11. The box A of a baling-press, having the slotted vertical diaphragm $r$, in combination with the double follower D, with its uniting-beam F passing through the slotted diaphragm, so as to form a double press, substantially as herein described.

ALLEN D. MILLER.

Witnesses:
   J. L. BOONE,
   OLWYN T. STACY.